March 22, 1938.  W. B. RHEES  2,111,733
STUFFING BOX
Filed July 9, 1935
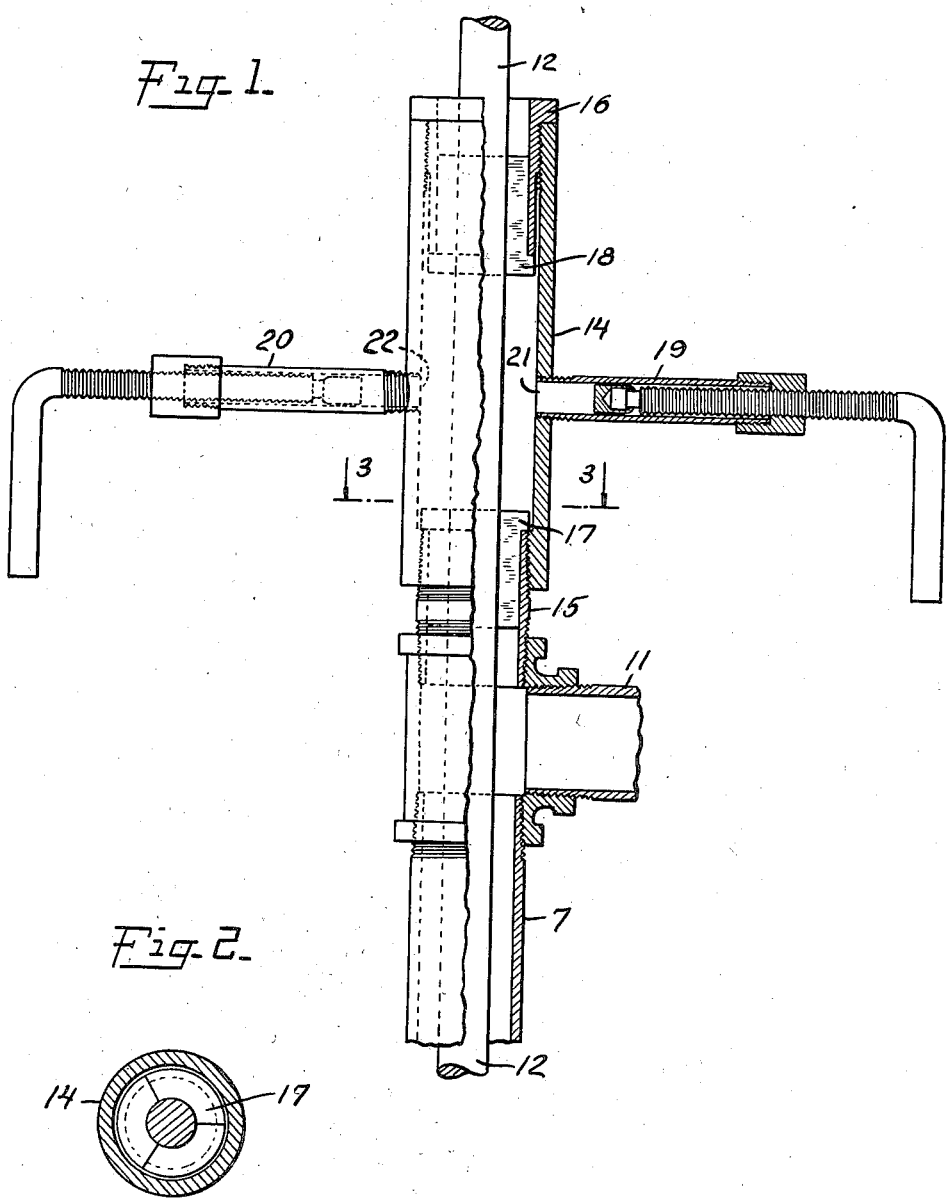
INVENTOR
William B. Rhees
BY
ATTORNEYS Patented Mar. 22, 1938

2,111,733

UNITED STATES PATENT OFFICE 2,111,733

STUFFING BOX

William B. Rhees, Wanette, Okla., assignor to Sinclair Prairie Oil Company, Tulsa, Okla., a corporation of Maine Application July 9, 1935, Serial No. 30,437

2 Claims. (Cl. 286—38)

This invention relates to an improved stuffing box of special value in application, at the casinghead, to the polish rod of pumping wells. This stuffing box, however, is of general application, and is of special utility in applications involving similar requirements.

In the conventional rig for operating plunger pumps in oil wells, a string of sucker rods reciprocated by a walking beam operates a plunger pump at the lower end of the well. The connections between the surface and the lower end of the well comprise a string of casing and a string of tubing, through which the plunger pump discharges, disposed within the casing. The casing and tubing terminate, at the surface, in a casinghead, gas being discharged from the casing through one connection and oil being discharged from the tubing through another connection. The string of sucker rods is connected to a polish rod which, at the casinghead, extends through a stuffing box. This invention provides an improved stuffing box having several important advantages in such use.

Regularity of operation is, of course, essential to economical operation of a pumping well. Repacking of the conventional stuffing boxes previously used in this connection has involved interruption of the operation and, to prolong the period between such interruptions, it has been necessary to fit the bushings used in such stuffing boxes with great precision in order to protect the packing to minimize requirements of repacking except in connection with replacement of worn bushings. With the conventional stuffing box, moreover, the stuffing box proper must be removed from the polish rod to permit the replacement of the bushings. Also with the conventional stuffing box, repacking has ordinarily involved the discarding of used packing material in the stuffing box at the time of the replacement.

The improved stuffing box of this invention facilitates the replacement of stuffing box bushings and makes it possible to replace such bushings without removing the stuffing box from the polish rod, minimizing any interruption of operation for replacement of bushings, it permits repacking or replacement of the packing material in the stuffing box without interrupting operation, minimizing the number of any interruptions of operation, and it affords improved economy with respect to packing material.

The improved stuffing box of this invention comprises, essentially, a tube internally threaded at both ends, a nipple threaded into one end of this tube and a gland threaded into the other end, a pair of flanged and split bushings, one of these bushings being positioned in the nipple with its flange over the end of the nipple within the tube and the other being positioned within the gland with its flange over the end of the gland within the tube, both of these bushings being removable through the end of the tube into which the gland is threaded when the gland is removed, and means opening into the space within the tube between the bushings for forcing packing material into this space without removing either of the bushings.

One form of stuffing box embodying the invention is illustrated in some detail in the accompanying drawing. In this drawing Fig. 1 is an elevation partly in section through a stuffing box embodying the invention as applied to a pumping well, a portion of the polish rod and casinghead being shown, and Fig. 2 is a detail of one of the bushings illustrated in Fig. 1, a view normal to the section constituting Fig. 1.

Referring more particularly to Figs. 1 and 2 of the drawing, the stuffing box illustrated comprises a tube 14 constituting a body portion, this tube being internally threaded at both ends, a nipple 15 threaded into the lower end and a gland 16 threaded into the upper end of this tube, a pair of flanged and split bushings 17 and 18 positioned in the bore of the nipple and in the bore of the gland, respectively, and a pair of compression tubes 19 and 20 for forcing packing material into the space within the tube 14 between the bushings 17 and 18 through openings 21 and 22. Each of the compression tubes 19 and 20 is fitted with a threaded ram but it will be apparent that other forcing means can be used. One, two or more such compression tubes can be used, but a pair of oppositely arranged compression tubes has been found to be advantageous. The bore of the compression tubes is with advantage made small with respect to the internal diameter of the tube 14 to facilitate the introduction of packing material and to minimize any tendency for packing material to be forced outwardly through the compression tubes. In the assembled stuffing box, the bushings 17 and 18 are positioned axially by the bores of the nipple and the gland and are held in place by the flanges with which the bushings are provided in cooperation with the packing material positioned between the inner ends of the bushings, the flanges of the bushings being positioned over the inner ends of the nipple and the gland. These bushings are proportioned so that they can be removed through the end of the tube 14 into which the gland 16 is threaded when this gland is removed. The bushings 17 and 18 are split, on planes parallel to the axis of the stuffing box when in position in the stuffing box, into two sections, three sections as illustrated (see Fig. 2) or more. By making the bore of the nipple 15 and the gland 16 of the same diameter, identical bushings, and bushing sections, can be used making all bushing parts interchangeable. By making the body portion of the bushing 18 somewhat shorter than the bore of the gland 16, a space within the upper part of the gland 16 is provided adapted to receive oil or other lubricant for lubricating the polish rod 12.

Once installed and initially packed, repacking of the improved stuffing box of this invention is carried out without interrupting the operation of the polish rod, the required additional packing being inserted in one or more of the compression tubes and forced into the stuffing box by operation of the threaded ram in the construction illustrated. This operation requires but a minimum of time, two or three minutes usually being sufficient. Moreover, this operation does not involve the handling or suspension of heavy parts of the stuffing box and, in this aspect, the invention saves many smashed fingers and hands. For example, repacking of the conventional stuffing box usually requires a heavy gland to be suspended around the polish rod immediately above the body of the stuffing box during the repacking, a cause of many hand and finger accidents involving serious injury. Such hazards are completely eliminated by the improved stuffing box of this invention.

Replacement of either or both of the bushings in the improved stuffing box of the invention involves interruption of the operation of the polish rod, but the replacement operation is so simple as to require but a minimum of time. In the construction illustrated, the gland 16 is unscrewed from the upper end of the body portion of the stuffing box, permitting the bushings 17 and 18 to be slid out of the body of the stuffing box along the polish rod and then, the bushings being split, to be simply lifted away from the polish rod. Reverse operation involved in inserting a new bushing is equally simple. Used packing removed from the stuffing box as an incident to bushing replacement can be used to repack the stuffing box upon replacement of the bushings, or this initial repacking can be done with new material and the used packing can be supplied, through the compression tubes, as make-up material as additional packing is required.

As will be apparent, the improved stuffing box of this invention is of inexpensive construction notwithstanding the fact that it can be repacked without interrupting operation.

Actual embodiments of the stuffing box of this invention have been in continuous operation in regular service on oil wells for periods upwards of seven months without interruption of operation of the polish rod and without any substantial loss of oil through the stuffing box.

I claim:

1. A stuffing box comprising a tube internally threaded at both ends, a nipple threaded into one end of said tube and a gland threaded into the other, a pair of flanged and split bushings, one of said bushings being positioned in said nipple with the flange over the end of the nipple within the tube, the other of said bushings being positioned in said gland with the flange over the end of the gland within the tube, both of said bushings being removable through the end of the tube into which the gland is threaded when the gland is removed, and means opening into the space within said tube between said bushings for forcing packing material into this space without removing either of said bushings.

2. A stuffing box comprising a tubular body element internally threaded at both ends, a nipple threaded into one end of said tubular body element and a gland threaded into the other, a pair of flanged and split bushings, one of said bushings being positioned in said nipple with the flange over the end of the nipple within the tubular body element, the other of said bushings being positioned in said gland with the flange over the end of the gland within the tubular body element, both of said bushings being removable through the end of the tubular body element into which the gland is threaded when the gland is removed, and means opening into the space within said tubular body element between said bushings for forcing packing material into the space without removing either of said bushings, said last-mentioned means comprising a plurality of compression tubes of substantially smaller bore than the bore of said tubular body and each fitted with a threaded ram.

WILLIAM B. RHEES.